US008830259B2

(12) United States Patent
Homma et al.

(10) Patent No.: US 8,830,259 B2
(45) Date of Patent: Sep. 9, 2014

(54) INFORMATION PROCESSING DEVICE, DISPLAY CONTROL METHOD AND PROGRAM

(75) Inventors: Fuminori Homma, Tokyo (JP); Tatsushi Nashida, Kanagawa (JP)

(73) Assignee: Sony Corporation (JP)

(*) Notice: Subject to any disclaimer, the term of this patent is extended or adjusted under 35 U.S.C. 154(b) by 392 days.

(21) Appl. No.: 12/802,325

(22) Filed: Jun. 4, 2010

(65) Prior Publication Data

US 2011/0007091 A1 Jan. 13, 2011

(30) Foreign Application Priority Data

Jul. 7, 2009 (JP) ................. P2009-160433

(51) Int. Cl.
*G09G 5/00* (2006.01)
*G06F 3/14* (2006.01)

(52) U.S. Cl.
CPC ............ *G06F 3/1431* (2013.01); *G06F 3/1446* (2013.01); *G09G 2300/026* (2013.01); *G09G 2360/02* (2013.01)
USPC ............... 345/619; 345/1.1; 345/3.4

(58) Field of Classification Search
USPC ........................................................ 345/619
See application file for complete search history.

(56) References Cited

U.S. PATENT DOCUMENTS

| 2006/0183505 | A1* | 8/2006 | Willrich ................. 455/566 |
| 2008/0062625 | A1* | 3/2008 | Batio ..................... 361/680 |
| 2009/0102744 | A1* | 4/2009 | Ram ....................... 345/1.1 |
| 2009/0187677 | A1* | 7/2009 | Hunt et al. ................ 710/14 |
| 2010/0321275 | A1* | 12/2010 | Hinckley et al. ............ 345/1.3 |

FOREIGN PATENT DOCUMENTS

JP 2007-241962 A 9/2007

OTHER PUBLICATIONS

Dugald Ralph Hutchings, Making Multiple Monitors More Manageable, PhD Dissertation, George Institute of Technology, Aug. 2006.*

* cited by examiner

*Primary Examiner* — Kee M Tung
*Assistant Examiner* — Haixia Du
(74) *Attorney, Agent, or Firm* — Lerner, David, Littenberg, Krumholz & Mentlik, LLP

(57) ABSTRACT

There is provided an information processing device that includes a communication portion, a detection portion and a display control portion. The communication portion communicates with an external device. The detection portion detects a posture of the information processing device. The display control portion controls display on a display screen based on one of a display format that is determined based on posture information indicating the posture of the information processing device detected by the detection portion and external posture information indicating a posture of the external device that is received by the communication portion, and a display format based on display switch information indicating a display format that is received by the communication portion.

8 Claims, 6 Drawing Sheets

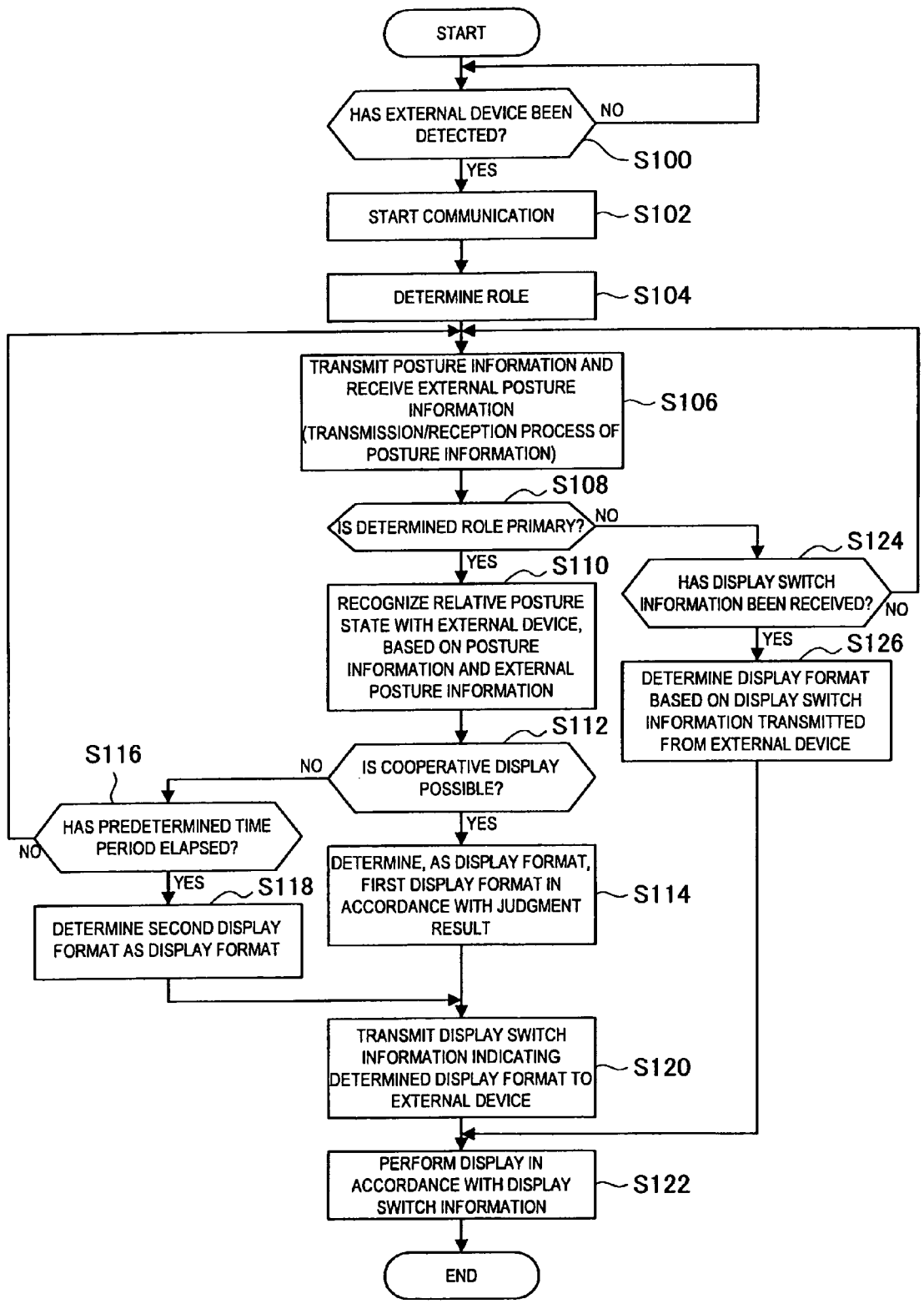

INFORMATION PROCESSING DEVICE, DISPLAY CONTROL METHOD AND PROGRAM

CROSS-REFERENCE TO RELATED APPLICATION

The present application claims priority from Japanese Patent Application No. JP 2009-160433 filed in the Japanese Patent Office on Jul. 7, 2009, the entire content of which is incorporated herein by reference.

BACKGROUND OF THE INVENTION

1. Field of the Invention

The present invention relates to an information processing device, a display control method and a program.

2. Description of the Related Art

Recently, more and more users are using a function called "multi-display" that causes a plurality of displays connected to an information processing device such as a personal computer (PC) to perform display as if the plurality of displays were a single display. If a user uses the multi-display function, the user can perform various operations using a display area that is difficult to obtain when a single display is used. There is therefore a possibility of improving operation efficiency, for example.

Given this situation, a technology to enable multi-display has been developed. For example, Japanese Patent Application Publication No. JP-A-2007-241962 discloses a technology that enables multi-display by providing a laptop PC with a mechanism that enables displays to be attached and detached.

SUMMARY OF THE INVENTION

With the known technology to enable multi-display (hereinafter referred to as the "known technology"), in order to enable multi-display, it is necessary for an information processing device, such as a laptop PC, to be provided with a mechanism (for example, wiring) that physically connects displays. With the known technology, the displays are connected by the above-described mechanism. Therefore, with the information processing device using the known technology (hereinafter also referred to as the "known information processing device"), depending on wiring conditions, for example, a posture in which the displays can be connected is restricted. Therefore, when the known technology is used, it is not expected to achieve flexible switching between display formats. More specifically, it is not expected that the display format of a display screen is dynamically switched in accordance with an arrangement posture of devices (for example, a relative posture state between the devices) that cooperate with each other to perform display.

Further, the multi-display function that is increasingly used in personal computers etc. is achieved by physically connecting a plurality of displays to a single PC, using cables. Even if the above usage pattern is used, for example, flexible switching between display formats is not expected to be achieved. More specifically, it is not expected that the display format of the display screen is dynamically switched in accordance with the arrangement posture (for example, the relative posture state) between the devices.

In light of the foregoing, it is desirable to provide a novel and improved information processing device, display control method and program that are capable of selectively switching a display format displayed on a display screen of each of devices, based on a relative posture state between the devices.

According to an embodiment of the present invention, there is provided an information processing device including a communication portion that communicates with an external device, a detection portion that detects a posture of the information processing device, and a display control portion that controls display on a display screen based on one of a display format that is determined based on posture information indicating the posture of the information processing device detected by the detection portion and external posture information indicating a posture of the external device that is received by the communication portion, and a display format based on display switch information indicating a display format that is received by the communication portion.

In this configuration, it is possible to selectively switch the display format displayed on the display screen of each of the devices, based on the relative posture state between the devices.

The information processing device may further include a role determination portion that determines, based on the communication with the external device, a role relating to display on the display screen of each of the information processing device and the external device that is a communication target. When the role determination portion determines that the information processing device performs a primary role that determines the display format on the display screen of each of the information processing device and the external device that is the communication target, the display control portion may determine, based on the posture information and the external posture information, the display format used by each of the information processing device and the external device corresponding to the external posture information.

The display control portion may judge a relative posture state between the information processing device and the external device, based on the posture information and the external posture information. Based on a judgment result, the display control portion selectively may determine one of a first display format in which the information processing device and the external device perform cooperative display, and a second display format in which the information processing device and the external device do not perform the cooperative display.

Based on the posture information and the external posture information, the display control portion may identify a first horizontal direction, a first vertical direction and a first depth direction of the information processing device and a second horizontal direction, a second vertical direction and a second depth direction of the external device, respectively. The display control portion may determine the first display format as the display format when an angle between the first horizontal direction and the second horizontal direction, an angle between the first vertical direction and the second vertical direction, and an angle between the first depth direction and the second depth direction each have a value within a predetermined range.

Based on a magnitude of each of the angles between corresponding directions and a predetermined threshold value, the display control portion may judge whether the relative posture state between the information processing device and the external device is one of a state indicating a forward direction and a state indicating a reverse direction. Based on a judgment result, the display control portion may determine one of a third display format corresponding to the forward direction and a fourth display format corresponding to the reverse direction, as the first display format.

The display control portion may cause the display switch information indicating the determined display format to be transmitted to the external device.

When the role determination portion determines that the information processing device does not perform the primary role, the display control portion may perform display on the display screen based on the display switch information received by the communication portion.

The information processing device may further include a coupling portion to and from which the external device is capable of being attached and detached, the coupling portion selectively holding a relative posture state with the external device.

According to another embodiment of the present invention, there is provided a display control method, including the steps of starting communication with an external device, determining, based on the communication with the external device, a role relating to display on a display screen of each of an information processing device and the external device that is a communication target, controlling display on the display screen based on a display format that is determined based on posture information indicating a detected posture of the information processing device and received external posture information indicating a posture of the external device, when it is determined in the determining step that the information processing device performs a primary role that determines the display format on the display screen of each of the information processing device and the external device that is the communication target, and controlling display on the display screen based on a display format that is based on received display switch information indicating a display format, when it is determined in the determining step that the information processing device does not perform the primary role.

With use of the above method, it is possible to selectively switch the display format displayed on the display screen of each of the devices, based on the relative posture state between the devices.

According to another embodiment of the present invention, there is provided a program including instructions that command a computer to perform the steps of starting communication with an external device, determining, based on the communication with the external device, a role relating to display on a display screen of each of an information processing device and the external device that is a communication target, controlling display on the display screen based on a display format that is determined based on posture information indicating a detected posture of the information processing device and received external posture information indicating a posture of the external device, when it is determined in the determining step that the information processing device performs a primary role that determines the display format on the display screen of each of the information processing device and the external device that is the communication target, and controlling display on the display screen based on a display format that is based on received display switch information indicating a display format, when it is determined in the determining step that the information processing device does not perform the primary role.

With use of the above program, it is possible to selectively switch the display format displayed on the display screen of each of the devices, based on the relative posture state between the devices.

According to the embodiments of the present invention described above, it is possible to selectively switch the display format displayed on the display screen of each of the devices, based on the relative posture state between the devices.

BRIEF DESCRIPTION OF THE DRAWINGS

FIG. 4 is a flowchart showing an example of processes according to the display control approach performed in the information processing device according to the embodiment of the present invention;

DETAILED DESCRIPTION OF THE EMBODIMENT(S)

Figure 1A:
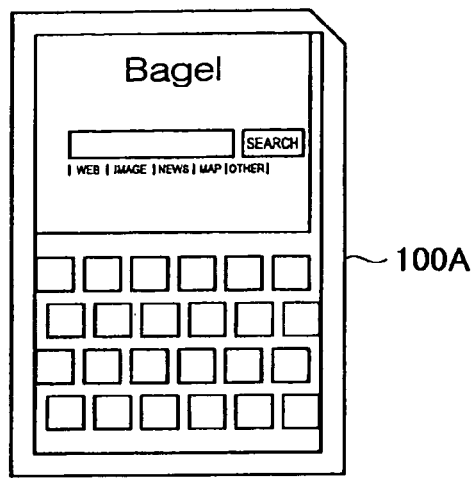
FIG. 1A is an explanatory diagram illustrating a display control approach used in an information processing device according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Hereinafter, a description will be made in the following order.

1. Approach according to an embodiment of the present invention

2. Information processing device according to the embodiment of the present invention 3. Program according to the embodiment of the present invention (Approach According to an Embodiment of the Present Invention)

Before explaining a structure of an information processing device (hereinafter also referred to as an "information processing device 100") according to an embodiment of the present invention, a display control approach according to the embodiment of the present invention will be described.

[Outline of Display Control Approach According to the Embodiment of the Present Invention]

Figure 1B:
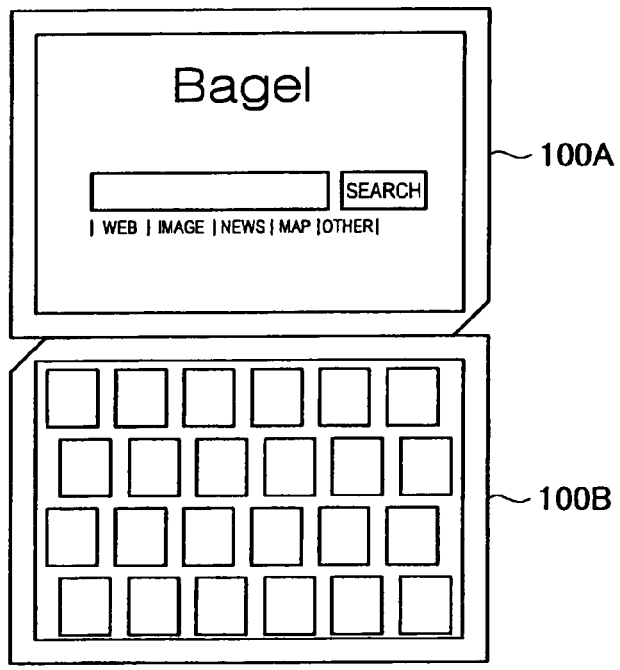
FIG. 1B is an explanatory diagram illustrating the display control approach used in the information processing device according to the embodiment of the present invention.
Figure 1C:
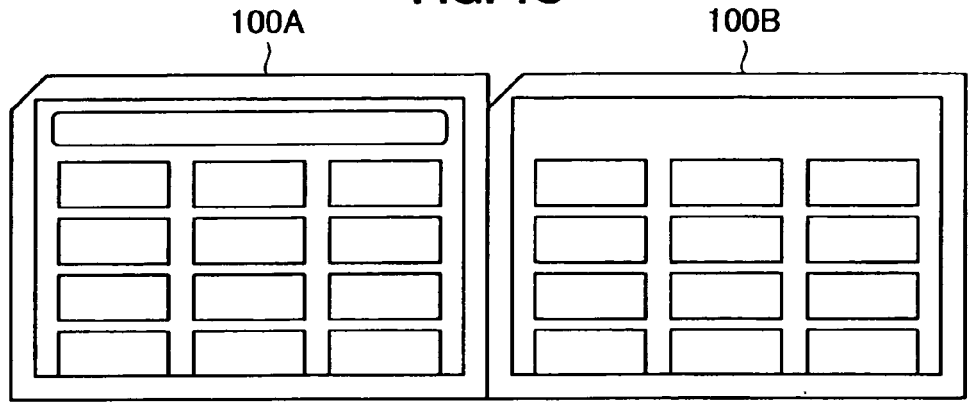
FIG. 1C is an explanatory diagram illustrating the display control approach used in the information processing device according to the embodiment of the present invention.

FIG. 1A to FIG. 1C are explanatory diagrams each illustrating the display control approach used in the information processing device 100 according to the embodiment of the present invention. Here, FIG. 1A shows a display example on a display screen of a single information processing device 100A. FIG. 1B and FIG. 1C each show a display example in which two information processing devices 100A and 100B perform display on their display screens in cooperation with each other.

[1] First Display Example (FIG. 1A)

As shown in FIG. 1A, when a web browser and a software keyboard, for example, are displayed on a single display screen, a user can perform a given operation using the single information processing device 100A. Therefore, when the user performs display using a display format such as that shown in FIG. 1A, namely, a display format in which cooperative display is not performed, it is possible to achieve improved portability (relating to display) and size reduction of the device.

[2] Second Display Example (FIG. 1B)

FIG. 1B shows a display example in which the web browser and the software keyboard displayed on the display screen of the information processing device 100A shown in FIG. 1A are cooperatively displayed on the display screen of the information processing device 100A and the display screen of the information processing device 100B. When the cooperative display is performed on the display screen of the information processing device 100A and the display screen of the information processing device 100B as shown in FIG. 1B, it is possible to enlarge a key pitch while maintaining a state in which the user can perform key input while browsing in a similar manner to FIG. 1A. Accordingly, if the information processing device 100A and the information processing device 100B cooperate with each other to perform display as shown in FIG. 1B, it is possible to achieve improved visibility and improved input usability.

[3] Third Display Example (FIG. 1C)

Further, the cooperative display performed by the information processing device 100A and the information processing device 100B is not limited to the example shown in FIG. 1B in which the information processing device 100A and the information processing device 100B are arranged in a longitudinal direction (a vertical direction). For example, as shown in FIG. 1C, the cooperative display can also be achieved when the information processing device 100A and the information processing device 100B are arranged in a lateral direction (a horizontal direction).

FIG. 1C shows an example in which a software keyboard is displayed on the display screen of the information processing device 100A and the display screen of the information processing device 100B. As shown in FIG. 1C, when the software keyboard is cooperatively displayed on the display screen of the information processing device 100A and the display screen of the information processing device 100B, a wider key pitch can be provided to the user than in the case where the single information processing device 100 is used. Accordingly, if the display screens such as those shown in FIG. 1C are provided in an application such as text memo, it is possible to improve usability in a key input operation by the user.

In the embodiment of the present invention, based on communication between the information processing devices 100, a display format in which the information processing device 100 independently performs display as shown in the first display example, and a display format in which the information processing devices 100 cooperate with each other to perform display as shown in the second display example or the third display example are selectively switched.

More specifically, the information processing device 100 according to the embodiment of the present invention has a function that detects a posture of the device itself, and generates posture information that indicates the detected posture. Further, based on communication with another information processing device 100, the information processing device 100 performs display on the display screen using either one of the following display formats: a display format that is determined based on the posture information and external posture information that indicates a posture of an external device; and a display format that is based on received display switch information.

Note that the information processing device 100 detects the posture of the device itself by detecting, for example, the horizontal direction, the vertical direction and the depth direction of the device itself. However, a posture detection method used in the information processing device 100 is not limited to that described above. In addition, the posture information according to the embodiment of the present invention may be, for example, information obtained by normalizing an inclination detected by an accelerator sensor, or information obtained by normalizing an inclination detected by a gyro sensor. However, the posture information according to the embodiment of the present invention is not limited to those described above. For example, the information processing device 100 can use, as the posture information, given information that can express the posture of the device itself. Further, for example, a unit matrix may be derived to normalize the inclination detected by various sensors, such as the accelerator sensor. However, the normalization of the detected inclination according to the embodiment of the present invention is not limited to this example.

The external posture information corresponds to posture information detected by the other information processing device 100. As a result, it can be said that the display format determined by the information processing device 100 based on the posture information and the external posture information is a display format that is determined based on a relative posture state between the device itself and the other information processing device 100 (external device). Examples of the posture state will be described later.

The display switch information according to the embodiment of the present invention is information that indicates the display format. The display switch information indicates the display format based on the relative posture state between the device itself and the external device, which is determined by the other information processing device 100 based on the posture information and the external posture information. Therefore, it can be said that the display format based on the display switch information that is received by the information processing device 100 is a display format that is determined based on the relative posture state between the information processing devices 100, similarly to the display format that is determined based on the posture information and the external posture information indicating the posture of the external device.

As described above, based on communication with the other information processing device 100, the information processing device 100 performs display on the display screen using the display format based on the relative posture state determined by the device itself or using the display format determined by the external device, thereby selectively switching the display format. Hereinafter, the other information processing device 100 that is a communication target of the information processing device 100 according to the embodiment of the present invention is also referred to as the "external device".

Note that, a wireless communication path that is formed by, for example, IEEE802.15.1, IEEE802.11 series, or Near Field Communication (NFC) can be used as a communication path through which communication between the information processing devices 100 according to the embodiment of the present invention is performed.

In the display control approach according to the embodiment of the present invention, as described above, the information processing device 100 performs communication with the external device, and performs display using the display format based on the relative posture state determined by the device itself or using the display format determined by the external device, thereby performing selective display switching. Note that, even when the information processing device 100 performs display using one of the display formats described above, the information processing device 100 can perform display using the display format that is determined based on the relative posture state between the information processing devices 100.

Therefore, by the use of the display control approach, the information processing device 100 can dynamically switch the display format of the display screen in accordance with the relative posture state between the information processing devices 100 that cooperate with each other to perform display. As a result, flexible switching between the display formats can be achieved.

In addition, the information processing device 100 performs communication with the external device by wireless communication using, for example, IEEE802.15.1, IEEE802.11 series, NFC or the like, and performs switching of the display format based on the communication. In other words, with the information processing device 100, a posture that enables connection with the external device is not restricted by a mechanism (for example, wiring) for physically connecting the external device, as in the known technology. Note that the information processing device 100 can also be provided with a coupling portion (which will be described later), for example, in order to maintain the relative posture state with the external device.

Moreover, recently, a detection device that detects posture, such as an accelerator sensor, and an apparatus including a communication device for performing communication using IEEE802.15.1 have become widely used. It can be said that these devices are multi-purpose devices. In the display control approach, the multi-purpose devices can be used to achieve dynamic switching between the display formats. Therefore, it is possible to improve versatility as compared to the known information processing device that is required to be provided with a unique mechanism for physically connecting an external device.

Therefore, by the display control approach according to the embodiment of the present invention, it is possible to selectively switch the display format displayed on the display screen of each of the devices, based on the relative posture state between the devices.

Note that the display examples according to the embodiment of the present invention are not limited to the first to third display examples shown in FIG. 1A to FIG. 1C. For example, although FIG. 1A to FIG. 1C each show an example in which the software keyboard that is a virtual operation device is displayed on the display screen, the virtual operation device may not be displayed. In that case, the information processing device 100 can allow an operation on the display screen to be performed using a physical operation device.

Further, FIG. 1B and FIG. 1C each show a case in which the information processing device 100A and the information processing device 100B are in contact with each other. However, in the embodiment of the present invention, even when they are not in contact with each other, it is possible to achieve the cooperative display. Further, FIG. 1B and FIG. 1C each show an example in which the two information processing devices 100, namely, the information processing device 100A and the information processing device 100B cooperate with each other to perform display. However, the cooperative display according to the embodiment of the present invention is not limited those described above. For example, in the embodiment of the present invention, three or more information processing devices 100 can achieve the cooperative display by processes according to the display control approach which will be described later.

Hereinafter, an example in which the display format is selectively switched in the two information processing devices 100, namely, the information processing device 100A and the information processing device 100B, is used to describe the processes according to the display control approach according to the embodiment of the present invention. Further, hereinafter, the display format in which the information processing devices 100 cooperate with each other to perform display as shown in FIG. 1B and FIG. 1C is also referred to as a "first display format". Further, the display format in which the information processing device 100 independently performs display as shown in FIG. 1A is also referred to as a "second display format".

[Outline of Processes According to Display Control Approach]

Next, an outline of the processes according to the display control approach according to the embodiment of the present invention will be described. The information processing device 100 achieves selective switching of the display format by performing the following processes (1) to (5), for example.

(1) Communication Process

When the information processing device 100 starts selective switching of the display format according to the display control approach, it detects the external device that performs cooperative display using a communication function. When the external device is detected, the information processing device 100 starts communication with the external device.

Here, the information processing device 100 detects the external device by performing polling, for example. However, a detection method for detecting the external device according to the embodiment of the present invention is not limited to that described above. Further, when a polling signal from the external device is detected, the information processing device 100 can start communication with the external device by sending back a reply to the external device.

(2) Role Determination Process

When the communication with the external device is started in the above-described process (1), the information processing device 100 determines, based on the communication with the external device, a role relating to display on each of the display screens of the device itself and the external device that is the communication target (hereinafter referred to as the communication target external device). In the process (2), the information processing device 100 determines, for example, whether or not it performs a "primary" role that determines the display format of each of the display screens of the device itself and the communication target external device.

When the information processing device 100 determines in the process (2) that it performs the primary role, the information processing device 100 performs the process (4) (display format determination process) to be described later, and determines the display format. Further, the information processing device 100 transmits the display switch information that indicates the determined display format to the communication target external device. Then, in the process (5) (display process) to be described later, the information processing device 100 performs display using the determined display format that is based on the display switch information. Hereinafter, the information processing device 100 that is determined as the device that performs the primary role is also referred to as a "primary device".

On the other hand, when the information processing device 100 determines in the process (2) that it does not perform the primary role, the information processing device 100 does not perform the process (4) (the display format determination process) to be described later. Then, in the process (5) (the display process) to be described later, the information processing device 100 performs display using the display format that is based on the received display switch information.

[Example of Role Determination Process]

Figure 2A:
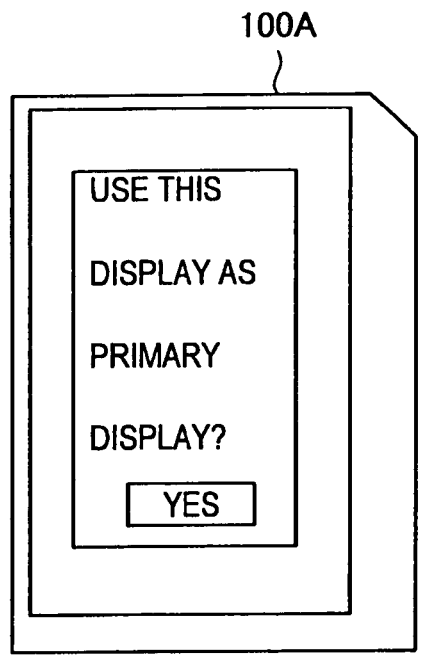
FIG. 2A is an explanatory diagram illustrating an example of a role determination process used in the information processing device according to the embodiment of the present invention.
Figure 2B:
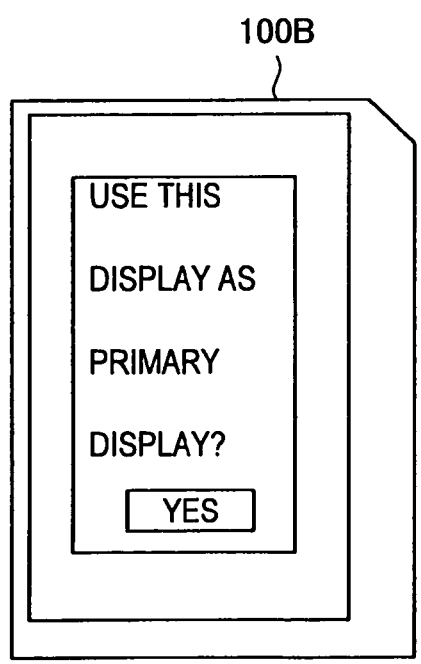
FIG. 2B is an explanatory diagram illustrating an example of the role determination process used in the information processing device according to the embodiment of the present invention.

FIG. 2A and FIG. 2B are explanatory diagrams each illustrating an example of the role determination process used in the information processing device 100 according to the embodiment of the present invention. More specifically, FIG. 2A shows an example of the display screen of the information processing device 100A that is one of the information processing devices 100 between which communication has been started in the above-described process (1) (the one of the information processing devices 100 is hereinafter also referred to as the first information processing device 100). FIG. 2B shows an example of the display screen of the information processing device 100B that is the other of the information processing devices 100 between which communication has been started in the above-described process (1) (the other of the information processing devices 100 is hereinafter also referred to as the second information processing device 100).

When the communication is started by the above-described process (1), each of the information processing devices 100 displays a dialog, an example of which is shown in FIG. 2A and FIG. 2B, on the display screen. If "yes" is selected by the first information processing device 100 ahead of the second information processing device 100, the first information processing device 100 determines that it performs the primary role, and deletes the dialog displayed on the display screen. Further, the first information processing device 100 transmits information (data) indicating that it performs the primary role to the second information processing device 100. In response to reception of the above-described information, the second information processing device 100 that has received the above-described information determines that it performs a "secondary" role that does not perform the primary role, and deletes the dialog displayed on the display screen. Note that the information processing device 100 that has determined that it performs the secondary role performs display using the display format that is based on the received display switch information. Hereinafter, the information processing device 100 that has determined that it performs the secondary role is also referred to as a "secondary device".

The information that indicates the determination to perform the primary role is transmitted and received between the information processing devices 100 in the above described manner, for example. Thus, each of the information processing devices 100 can determine the role relating to display on each of the display screens of the device itself and the communication target external device.

Note that the role determination process used in the information processing device 100 according to the embodiment of the present invention is not limited to the examples described above. For example, the role determination can be made by mutually transmitting and receiving information that indicates an operation mode (for example, a normal operation mode, a standby mode etc.) between the information processing devices 100, between which communication has been started by the above-described process (1). If the first information processing device 100 is in the standby mode, as a result of mutually transmitting and receiving the information that indicates the operation mode between the information processing devices 100, between which communication has been started by the above-described processing (1), the second information processing device 100 can determine that it performs the primary role.

Further, the first information processing device 100 that has transmitted a signal (a polling signal, for example) serving as a trigger to start communication in the above-described process (1) may determine that it performs the primary role, and the second information processing device 100 may determine that it performs the secondary role.

(3) Transmission/Reception Process of Posture Information

The information processing device 100 transmits the posture information based on the detected posture of the device itself to the communication target external device, regardless of the role determined in the above-described process (2). Further, in a similar manner, the communication target external device also transmits the posture information (namely, the external posture information) of the device itself. Therefore, the information processing device 100 receives the external posture information transmitted from the external device. Further, the information processing device 100 performs the process (3), for example, until it determines the display format in the process (4) (to be described later) or until the display switch information is received.

Note that the information processing device 100 performs the process (3) after determining the role in the above-described process (2), for example. However, the process used in the information processing device 100 is not limited to that described above. For example, the information processing device 100 may start the process (3) after the communication with the external device has been started in the above-described process (1). In this case, the information processing device 100 performs the process (3) in parallel with the above-described process (2).

(4) Display Format Determination Process

When the information processing device 100 has determined, in the above-described process (2), that it performs the primary role, the information processing device 100 (the primary device) recognizes the relative posture state with the external device, based on the posture information of the device itself and the received external posture information. Then, the information processing device 100 judges whether cooperative display is possible based on the recognized posture state, and determines the display format based on a judgment result.

[Example of Recognition Method of Relative Posture State]

Based on the posture information, the information processing device 100 identifies the horizontal direction of the device itself (hereinafter referred to as the "first horizontal direction"), the vertical direction of the device itself (hereinafter referred to as the "first vertical direction"), and the depth direction of the device itself (hereinafter referred to as the "first depth direction"). Further, based on the external posture information, the information processing device 100 identifies the horizontal direction of the external device (hereinafter referred to as the "second horizontal direction"), the vertical direction of the external device (hereinafter referred to as the "second vertical direction"), and the depth direction of the external device (hereinafter referred to as the "second depth direction"). In the description below, in some cases, the horizontal direction is represented by "x", the vertical direction is represented by "y" and the depth direction is represented by "z".

The information processing device 100 determines the display format based on an angle between the first horizontal direction and the second horizontal direction, an angle between the first vertical direction and the second vertical direction, and an angle between the first depth direction and the second depth direction.

More specifically, when a magnitude of each of the angles between the corresponding directions has a value within a predetermined range, the information processing device 100 determines, as the display format, the first display format in which cooperative display is performed. On the other hand, when the magnitude of each of the angles between the corresponding directions is not within the predetermined range, the information processing device 100 determines, as the display format, the second display format in which the information processing device 100 independently performs display.

Here, examples of the predetermined range include "$0 \leq A \leq (0+\alpha)$" and "$(\pi-\beta) \leq A \leq \pi$". However, the predetermined range is not limited to these examples. Note that "A" indicates the value of each of the angles between the corresponding directions. Further, "$\alpha$" is a first threshold value that defines the predetermined range, and "$\beta$" is a second threshold value that defines the predetermined range. Each of the values "$\alpha$" and "$\beta$" can be set to a value determined in advance, but each of the values "$\alpha$" and "$\beta$" can be set differently. For example, the information processing device 100 can set each of the values "$\alpha$" and "$\beta$" based on an operation signal in accordance with a user operation that is transmitted from an operation portion (which will be described later).

When the information processing device 100 judges that each of the angles between the corresponding directions is within the predetermined range, the information processing device 100 further judges whether the relative posture state between the device itself and the external device is a state indicating a forward direction or a state indicating a reverse direction. When the information processing device 100 judges that the relative posture state is the state indicating the forward direction, it determines a third display format, which corresponds to the forward direction, as the first display format. On the other hand, when the information processing device 100 judges that the relative posture state is the state indicating the reverse direction, it determines a fourth display format, which corresponds to the reverse direction, as the first display format. In summary, the first display format determined by the information processing device 100 indicates, for example, the third display format corresponding to the forward direction or the fourth display format corresponding to the reverse direction.

More specifically, based on the magnitude of each of the angles between the corresponding directions and a predetermined threshold value, for example, when each of the angles between the corresponding directions is equal to or smaller than the predetermined threshold value (or smaller than the predetermined threshold value), the information processing device 100 judges that the relative posture state is the state indicating the forward direction. On the other hand, when each of the angles between the corresponding directions is larger than the predetermined threshold value (or equal to or larger than the predetermined threshold value), the information processing device 100 judges that the relative posture state is the state indicating the reverse direction.

For example, the above-described first threshold value "$\alpha$" can be used as the predetermined threshold value. However, the predetermined threshold value is not limited to this. In this case, the above-described first threshold value "$\alpha$" serves as a threshold value to judge whether or not the relative posture state between the device itself and the external device is the state indicating the forward direction.

Figure 3A:
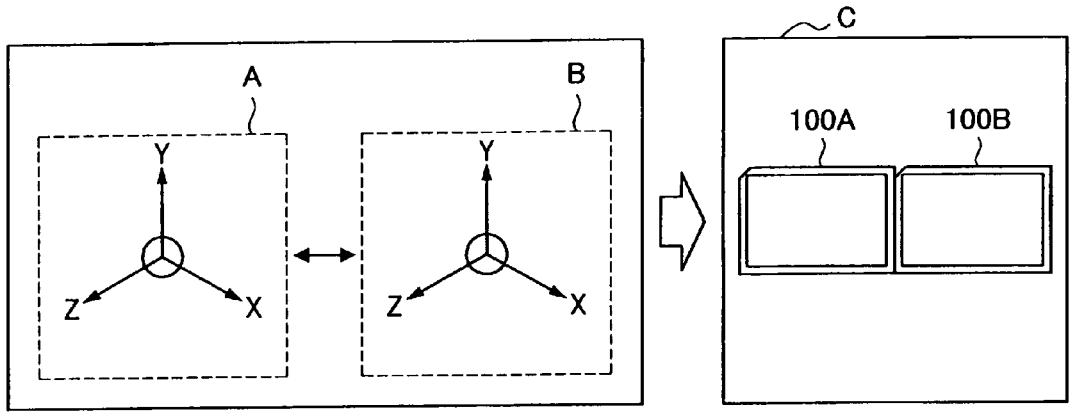
FIG. 3A is an explanatory diagram illustrating an example of a recognition method of a relative posture state used in the information processing device according to the embodiment of the present invention.
Figure 3B:
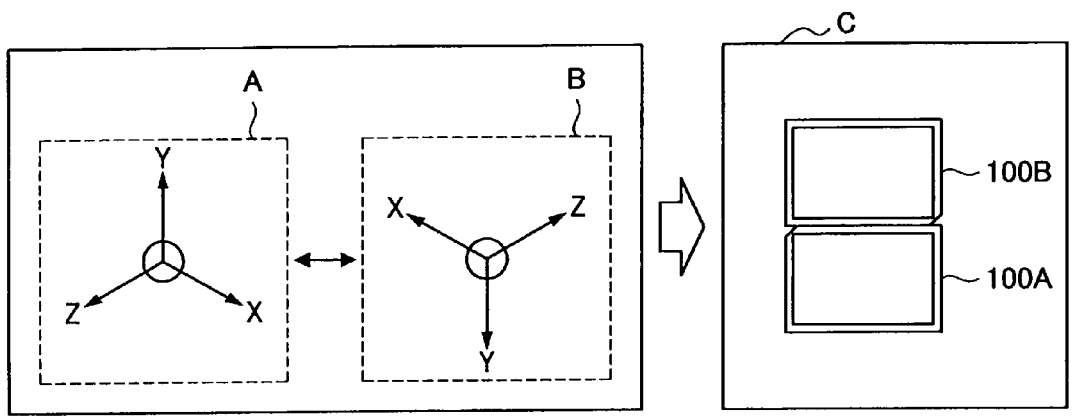
FIG. 3B is an explanatory diagram illustrating an example of the recognition method of the relative posture state used in the information processing device according to the embodiment of the present invention.
Figure 3C:
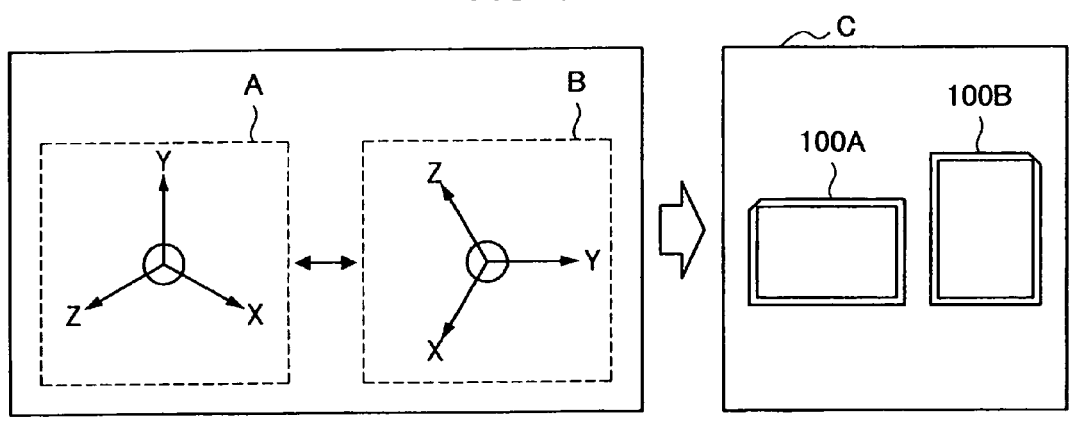
FIG. 3C is an explanatory diagram illustrating an example of the recognition method of the relative posture state used in the information processing device according to the embodiment of the present invention.

FIG. 3A to FIG. 3C are explanatory diagrams each illustrating an example of a recognition method of the relative posture state used in the information processing device 100 according to the embodiment of the present invention. In the description below, the example of the recognition method of the relative posture state used in the information processing device 100 will be explained using, as an example, the relative posture state between the information processing device 100A and the information processing device 100B. Further, in the description below, of the information processing device 100A and the information processing device 100B, the information processing device 100 that performs the primary role is referred to as the primary device.

The symbol A shown in FIG. 3A to FIG. 3C indicates the horizontal direction, the vertical direction and the depth direction that are obtained from the posture information of the information processing device 100A. Further, the symbol B shown in FIG. 3A to FIG. 3C indicates the horizontal direction, the vertical direction and the depth direction that are obtained from the posture information of the information processing device 100B. Note that one of the symbol A and the symbol B shown in FIG. 3A FIG. 3C corresponds to the external posture information.

[i] First Example of Posture State

For example, as shown in FIG. 3A, when the directions identified based on the posture information respectively match the directions identified based on the external posture information (when the above-described value "A" is equal to zero), the primary device assumes that the relative posture state is a state shown by the symbol C in FIG. 3A, for example. In this case, the primary device determines, as the display format, the third display format (for example, the display format corresponding to FIG. 1C) that corresponds to the forward direction.

[ii] Second Example of Posture State

For example, as shown in FIG. 3B, when the directions identified based on the posture information are respectively opposite to the directions identified based on the external posture information (when the above-described value "A" is equal to $\pi$), the primary device assumes that the relative posture state is a state shown by the symbol C in FIG. 3B, for example. In this case, the primary device determines, as the display format, the fourth display format (for example, the display format corresponding to FIG. 1B) that corresponds to the reverse direction.

[iii] Third Example of Posture State

For example, as shown in FIG. 3C, when the directions identified based on the posture information are neither matched with, nor opposite to, the directions identified based on the external posture information, the primary device assumes that the relative posture state is a state shown by the symbol C in FIG. 3C, for example. In this case, the primary device determines, as the display format, the second display format (for example, the display format corresponding to FIG. 1A) in which the information processing device 100 independently performs display.

The information processing device 100 determines the display format based on the posture information and the external posture information as describe above, for example. Note that it is needless to mention that the determination method of the display format used in the information processing device 100 according to the present invention is not limited to that described above.

The information processing device 100 transmits the display switch information indicating the determined display format to the communication target external device (i.e., the other information processing device 100 that has determined that it performs the secondary role).

(5) Display Process

When the information processing device 100 has determined, in the above-described process (2), that it performs the primary role, the information processing device 100 performs display in accordance with the display format indicated by the display switch information transmitted to the external device. On the other hand, when the information processing device 100 has determined, in the above-described process (2), that it performs the secondary role, the information processing device 100 performs display in accordance with the display format indicated by the received display format.

When the display switch information indicates the first display format (the third display format/the fourth display format), the cooperative display between the information processing devices 100 is achieved by transmitting data relating to display from the primary device to the secondary device.

If the information processing device 100 performs, for example, the above-described processes (1) to (5), it is possible to selectively switch the display format displayed on the display screen of each of the devices, based on the relative posture state between the devices.

[Specific Example of Processes According to Display Control Approach According to the Embodiment of the Present Invention]

Next, the processes according to the display control approach according to the embodiment of the present invention used in the information processing device 100 will be described more specifically. FIG. 4 is a flowchart showing an example of the processes according to the display control approach performed in the information processing device 100 according to the embodiment of the present invention.

The information processing device 100 judges whether or not the external device (the other information processing device 100) has been detected (step S100). For example, when the information processing device 100 receives a reply in response to the transmitted polling signal, or when the information processing device 100 receives a polling signal transmitted from the external device, it is judged that the external device has been detected. However, the process at step S100 performed by the information processing device 100 is not limited to that described above.

When it is judged at step S100 that the external device has not been detected, the information processing device 100 does not proceed to the next step until the external device is detected.

On the other hand, when it is judged at step S100 that the external device has been detected, the information processing device 100 starts communication with the detected external device in accordance with the display control approach (step S102). At the time of starting communication, the information processing device 100 and the external device perform initialization to start the communication, for example, device authentication such as SSID/Password (when the communication is performed using a wireless local area network (LAN)).

When a plurality of the external devices are detected, the information processing device 100 can perform the communication with all the detected external devices in accordance with the display control approach. However, the process performed by the information processing device 100 when the plurality of external devices are detected is not limited to that described above. For example, when the cooperative display is performed between the two information processing devices 100 as shown in FIG. 1B and FIG. 1C, the number of communication targets with which the communication according to the display control approach is performed may be determined in advance. In this case, the information processing device 100 can determine the communication target based on a predetermined priority order, for example, in the descending order of field strength of the external devices, or in chronological order of replies in response to polling signals. In the description below, the processes according to the display control approach are explained using an example in which a single external device is detected at step S100.

When the communication with the external device is started at step S102, the information processing device 100 determines the role relating to display on the respective display screens of the device itself and the communication target external device (step S104). When the dialog shown in FIG. 2A and FIG. 2B, for example, is displayed on the display screen and "yes" is selected by the user, the information processing device 100 determines that it performs the primary role. However, the process at step S104 performed by the information processing device 100 is not limited to that described above. When the information processing device 100 receives the information that indicates the determination to perform the primary role, the information processing device 100 determines that it does not perform the primary role (in this case, the information processing device 100 determines that it performs the secondary role, for example).

The information processing device 100 transmits the posture information indicating the posture of the device itself to the external device, and receives the external posture information transmitted from the external device (the transmission/reception process of the posture information at step S106).

Note that, although FIG. 4 shows an example in which the information processing device 100 performs the process at step S106 after the process at step S104, the process performed by the information processing device 100 is not limited to this example. For example, the information processing device 100 can perform the process at step S104 and the process at step S106 independently from each other. In this case, the information processing device 100 can perform the process at step S104 after the process at step S106, or it can perform the process at step S106 in synchronization with the start of the process at step S104.

The information processing device 100 judges whether the role determined at step S104 is primary or not (step S108).

<When it is Judged that Role is Primary>

When it is judged at step S108 that the determined role is primary, the information processing device 100 recognizes the relative posture state with the external device, based on the posture information and the external posture information (step S110). At this time, the information processing device 100 determines the display format based on, for example, the angle between the first horizontal direction and the second horizontal direction, the angle between the first vertical direction and the second vertical direction, and the angle between the first depth direction and the second depth direction. However, the determination method of the display format according to the embodiment of the present invention is not limited to that described above.

Then, based on the relative posture state with the external device recognized at step S110, the information processing device 100 judges whether or not the cooperative display (namely, the display using the first display format) is possible (step S112). At this time, the information processing device 100 performs judgment at step S112 based on, for example, whether or not each of the angles between the corresponding directions is within the predetermined range, and whether or not each of the angles is equal to or smaller than the predetermined threshold value (or smaller than the predetermined threshold value) when it is within the predetermined range. However, the process at step S112 performed by the information processing device 100 is not limited to that described above.

When it is judged at step S112 that the cooperative display is possible, the information processing device 100 determines, as the display format, the first display format (the third display format/the fourth display format) that corresponds to a judgment result at step S112 (step S114).

On the other hand, when it is judged at step S112 that the cooperative display is not possible, the information processing device 100 judges whether or not a predetermined time period has elapsed after the role has been determined, for example (step S116). Note that, three seconds, ten seconds, etc., for example, can be set as the predetermined time period. However, the predetermined time period is not limited to those described above. Further, it is needless to mention that the predetermined time period is not limited to the time period after the role has been determined.

When it is judged at step S116 that the predetermined time period has elapsed, the information processing device 100 determines, as the display format, the second display format in which the information processing device 100 independently performs display (step S118).

When it is judged at step S116 that the predetermined time has not elapsed, the information processing device 100 repeats the processes from step S106. As described above, after the elapse of the predetermined time, the information processing device 100 determines the second display format as the display format. Thus, it is possible to increase the likelihood of the cooperative display being performed between the information processing device 100 and the communication target external device. Note that it is needless to mention that, when it is judged at step S112 that the cooperative display is not possible, the information processing device 100 can determine the second display format as the display format without waiting for the elapse of the predetermined time period.

After the information processing device 100 has determined the display format at step S114 or step S118, it transmits the display switch information indicating the determined display format to the communication target external device (step S120).

At this time, the information processing device 100 may transmit the display switch information that additionally includes information other than the information indicating the determined display format. For example, when the information processing device 100 determines that it performs display using the second display format, the display switch information may include a command to cause the external device to perform another operation, such as a command to cause a shift to the standby mode, a command to turn off a power source, or the like. However, the display switch information according to the embodiment of the present invention is not limited to those described above.

Then, the information processing device 100 performs display in accordance with the display switch information (step S122). When the display switch information indicates the first display format, the information processing device 100 achieves the cooperative display with the communication target external device, for example, by transmitting the data relating to display to the communication target external device as necessary. However, the method for achieving the cooperative display with the communication target external device according to the embodiment of the present invention is not limited to that described above.

<When it is Judged that Role is Not Primary>

When it is judged that the role determined at step S108 is not primary, the information processing device 100 judges whether or not the display switch information has been received (step S124).

When it is judged at step S124 that the display switch information has not been received, the information processing device 100 repeats the processes from step S106.

On the other hand, when it is judged at step S124 that the display switch information has been received, the information processing device 100 determines the display format based on the display switch information transmitted from the external device (the primary device) (step S126).

Then, the information processing device 100 performs display in accordance with the display switch information (step S122). The information processing device 100 can perform the cooperative display with the communication target external device by receiving the data relating to display that is transmitted from the communication target external device (the primary device) as necessary. However, the method for achieving the cooperative display with the communication target external device according to the embodiment of the present invention is not limited to that described above. Further, when the received display switch information includes a command to cause the external device to perform another operation, the information processing device 100 can also perform a process in accordance with the command. Note that it is needless to mention that, when the received display switch information includes the command to cause the external device to perform the other operation, the information processing device 100 can reject the command to perform the process.

The process (1) (the communication process) to the process (5) (the display process) according to the display control approach are achieved by the processes shown in FIG. 4. Thus, the information processing device 100 can selectively switch the display format displayed on the display screen of each of the devices, based on the relative posture state between the devices.

(Information Processing Device According to the Embodiment of the Present Invention)

Next, a structural example of the information processing device 100 according to the embodiment of the present invention, which can achieve the above-described display control approach according to the embodiment of the present invention, will be described.

Figure 5:
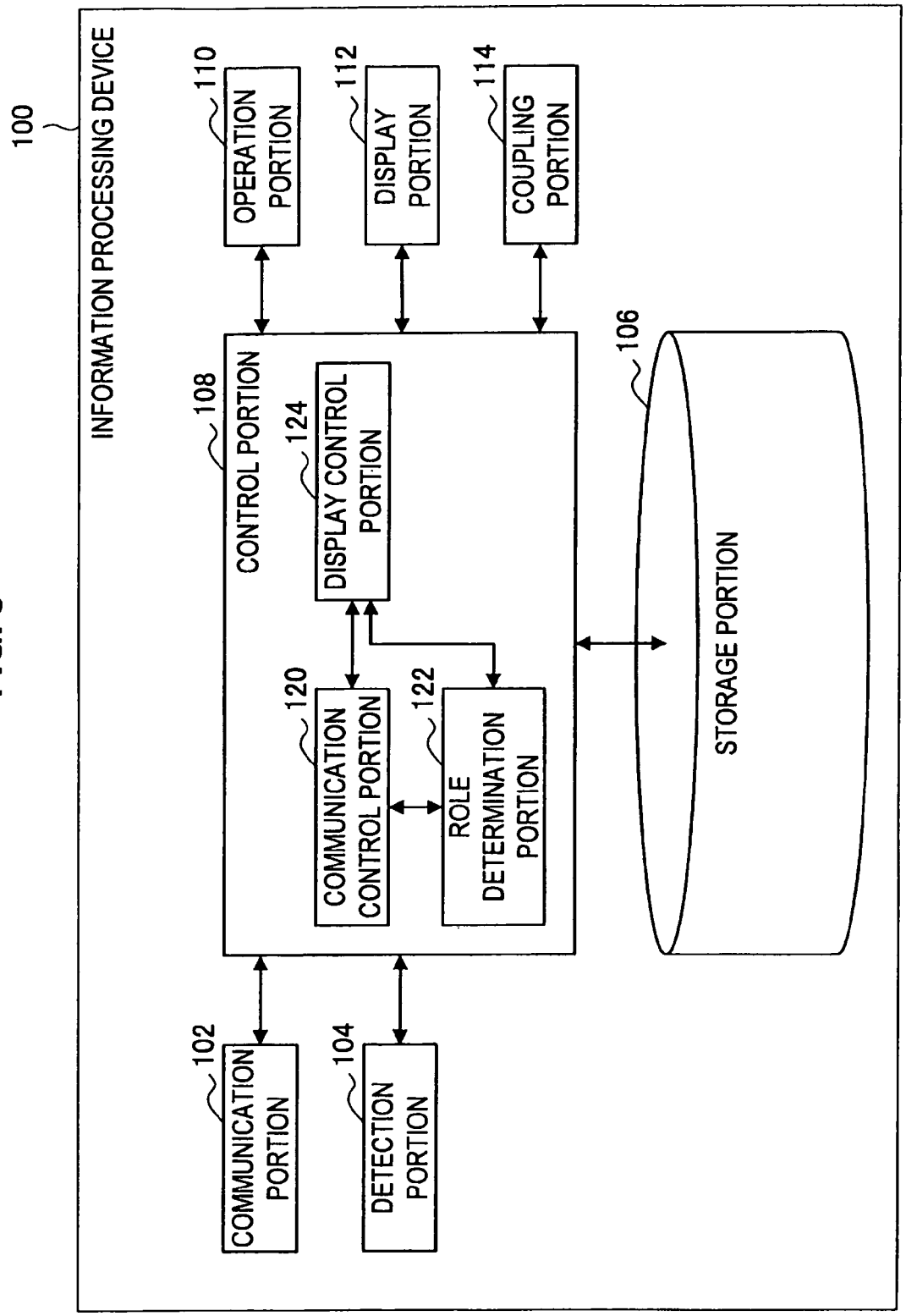
FIG. 5 is an explanatory diagram illustrating an example of a structure of the information processing device according to the embodiment of the present invention.

FIG. 5 is an explanatory diagram illustrating an example of the structure of the information processing device 100 according to the embodiment of the present invention. The information processing device 100 includes a communication portion 102, a detection portion 104, a storage portion 106, a control portion 108, an operation portion 110, a display portion 112 and a coupling portion 114.

Further, the information processing device 100 may include, for example, a read only memory (ROM) and a random access memory (RAM) that are not shown in the figures. The structural elements of the information processing device 100 are connected using a bus that serves as a data communication path, for example.

The ROM (not shown in the figures) stores control data such as a program and an operation parameter etc. used by the control portion 108. The RAM (not shown in the figures) temporarily stores the program etc. executed by the control portion 108.

[Hardware Configuration of the Information Processing Device 100]

Figure 6:
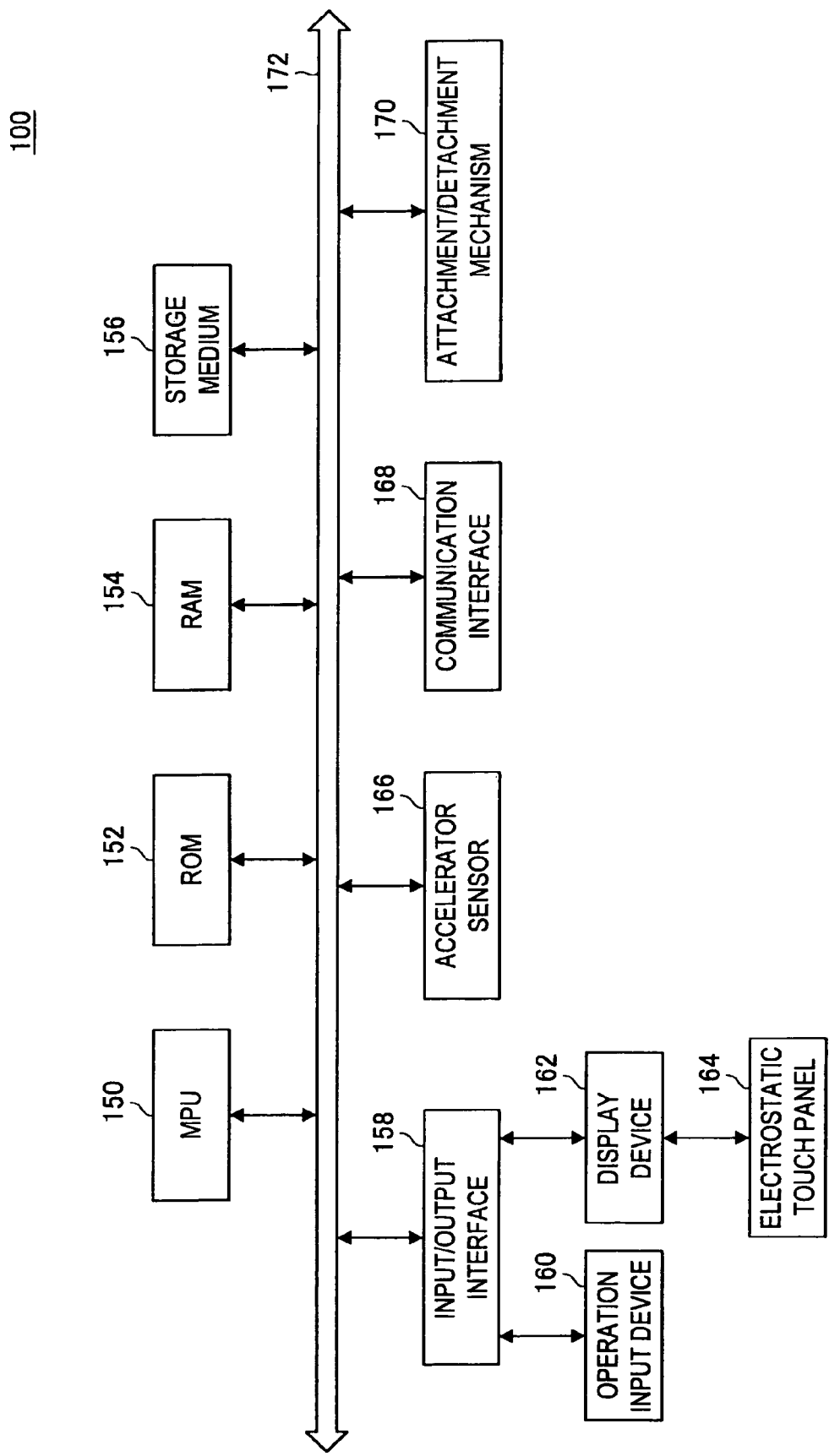
FIG. 6 is an explanatory diagram illustrating an example of a hardware configuration of the information processing device according to the embodiment of the present invention.

FIG. 6 is an explanatory diagram illustrating an example of a hardware configuration of the information processing device 100 according to the embodiment of the present invention. As shown in FIG. 6, the information processing device 100 includes, for example, a micro processing unit (MPU) 150, a ROM 152, a RAM 154, a recording medium 156, an input/output interface 158, an operation input device 160, a display device 162, an electrostatic touch panel 164, an accelerator sensor 166, a communication interface 168 and an attachment/detachment mechanism 170. Further, these configuration elements of the information processing device 100 are connected using a bus 172 that serves as a data communication path, for example.

The MPU 150 is formed by an integrated circuit, in which a plurality of circuits are integrated to achieve a control function, and the like. The MPU 150 functions as the control portion 108 that controls the whole information processing device 100. Further, in the information processing device 100, the MPU 150 can also serve as a communication control portion 120, a role determination portion 122 and a display control portion 124 that will be described later.

The ROM 152 stores control data such as a program and an operation parameter etc. used by the MPU 150. The RAM 154 temporarily stores the program etc. executed by the MPU 150.

The recording medium 156 functions as the storage portion 106, and stores various data, such as content data, various types of applications and the like. The recording medium 156 may be, for example, a magnetic recording medium such as hard disk, or a nonvolatile memory such as an electrically erasable and programmable read-only memory (EEPROM), a flash memory, a magnetoresistive random access memory (MRAM), a ferroelectric random access memory (FeRAM), or a phase change random access memory (PRAM).

For example, the operation input device 160 and the display device 162 are connected to the input/output interface 158. The operation input device 160 functions as the operation portion 110, and the display device 162 functions as the display portion 112. The input/output interface 158 may be, for example, a universal serial bus (USB) terminal, a digital visual interface (DVI) terminal, a high-definition multimedia interface (HDMI) terminal, or various types of processing circuits. Note that it is needless to mention that an operation input device (for example, a keyboard and a mouse) and a display device (for example, an external display), which are external devices of the information processing device 100, can also be connected to the input-output interface 158.

The operation input device 160 is mounted, for example, on the information processing device 100, and is connected to the input/output interface 158 inside the information processing device 100. The operation input device 160 may be, for example, a button, a direction key, a rotary selector such as a jog dial, or a combination of these.

The display device 162 is mounted, for example, on the information processing device 100, and is connected to the input/output interface 158 inside the information processing device 100. The display device 162 may be, for example, a liquid crystal display (LCD) or an organic electroluminescence (EL) display (which is also called an organic light emitting diode (OLED) display).

At least one electrostatic touch panel 164 that can detect a user's touch operation is provided on the display device 162. With the provision of the display device 162 and the electrostatic touch panel 164, the information processing device 100 can achieve a virtual operation device, examples of which are shown in FIG. 1A to FIG. 1C.

The accelerator sensor 166 functions as the detection portion 104, and detects the posture of the device itself to generate detection information indicating the posture. The detection information generated by the accelerator sensor 166 is transmitted to the MPU 150, for example. The MPU 150 generates the posture information by normalizing the detection information indicating the posture. Note that a configuration element that performs a process to normalize the detection information generated by the accelerator sensor 166 is not limited to the MPU 150. For example, the accelerator sensor 166 may have a function that generates the posture information based on the detection information, or a configuration element other than the MPU 150 may perform the process to normalize the detection information.

The communication interface 168 is a communication unit included in the information processing device 100, and functions as the communication portion 102 that performs communication with an external device. The communication interface 168 may be an IEEE802.15.1 port and a transmitting/receiving circuit, an IEEE802.11b port and a transmitting/receiving circuit, or the like. However, the communication interface 168 is not limited to those described above. For example, when communication with the external device is performed by wireless communication using, for example, NFC, the information processing device 100 may include, as the communication interface 168, a resonance circuit (a transmitting/receiving antenna), a demodulation circuit, a modulation circuit that performs amplitude shift keying (ASK) modulation, or the like.

The attachment/detachment mechanism 170 functions as the coupling portion 114, and allows the external device to be attached and detached. The provision of the attachment/detachment mechanism 170 allows the information processing device 100 to selectively hold the relative posture state with the external device. The attachment/detachment mechanism 170 may be a hinge, for example.

With the configuration shown in FIG. 6, for example, the information processing device 100 performs the process (1) (the communication process) to the process (5) (the display process), and thereby achieves the display control approach according to the embodiment of the present invention.

Note that the hardware configuration of the information processing device 100 according to the embodiment of the present invention is not limited to the configuration shown in FIG. 6. For example, in place of the accelerator sensor 166, the information processing device 100 according to the embodiment of the present invention may include any device, such as a gyro sensor, that can detect the posture of the information processing device 100. Further, the information processing device 100 according to the embodiment of the present invention may include a touch panel of a given type, in place of the electrostatic touch panel 164, or it may not include the electrostatic touch panel 164.

Referring back to FIG. 5, the structural elements of the information processing device 100 will be described. The communication portion 102 is a communication unit included in the information processing device 100, and it performs communication with an external device. The communication portion 102 can perform communication with the external device by, for example, wireless communication using IEEE802.15.1, wireless communication using the IEEE802.11 series, or the like.

The detection portion 104 detects the posture information of the device itself and transmits a detection result to the control portion 108. At this time, the detection portion 104 may transmit detection information in accordance with the detection result to the control portion 108, or it may derive the posture information obtained by normalizing the detection information and transmit the derived posture information to the control portion 108. In a case where the detection portion 104 transmits the detection information in accordance with the detection result to the control portion 108, the posture information is derived by the control portion 108, for example.

The detection portion 104 may be an accelerator sensor or a gyro sensor, for example. However, the detection portion 104 is not limited to those described above. For example, the information processing device 100 may include, as the detection portion 104, any device that can detect the posture of the device itself.

The storage portion 106 is a storage unit included in the information processing device 100. The storage portion 106 may be, for example, a magnetic recording medium such as hard disk, a nonvolatile memory such as a flash memory, or the like. The storage portion 106 stores various data, such as content data, various types of applications and the like.

The control portion 108 is formed by, for example, an MPU, an integrated circuit in which various processing circuits are integrated, and the like, and functions to control the whole information processing device 100. Further, the control portion 108 includes the communication control portion 120, the role determination portion 122 and the display control portion 124, and it performs a leading role in performing the process (1) (the communication process) to the process (5) (the display process).

The communication control portion 120 controls the communication portion 102, and serves to perform the process (1) (the communication process) and the above-described process (3) (the transmission/reception process of the posture information). More specifically, for example, the communication control portion 120 operates in cooperation with the display control portion 124 to cause the communication portion 102 to selectively transmit the posture information. Further, when the communication portion 102 receives the external posture information, the communication control portion 120 transmits the external posture information to the display control portion 124.

The role determination portion 122 serves to perform the above-described process (2) (the role determination process). More specifically, when communication with the external device is started by the above-described process (1), the role determination portion 122 displays the dialogue shown in FIG. 2A and FIG. 2B, for example. When an operation signal indicating that the user has selected "yes", for example, is transmitted from the operation portion 110, the role determination portion 122 determines that the device itself performs the primary role. On the other hand, when the communication portion 102 receives the information that indicates the determination to perform the primary role, the role determination portion 122 determines that the device itself does not perform the primary role (in this case, the role determination portion 122 determines that the device itself performs the secondary role, for example). Then, the role determination portion 122 transmits the determined role to the display control portion 124.

The display control portion 124 serves to perform the above-described process (4) (the display format determination process) and the above-described process (5) (the display process), and performs the processes in accordance with the role determined by the role determination portion 122.

[When it is Determined that Device Itself Performs Primary Role]

When the role determination portion 122 determines that the device itself performs the primary role, the display control portion 124 recognizes the relative posture state with the communication target external device, based on the posture information and the received external posture information. Further, the display control portion 124 judges whether or not the cooperative display is possible based on the recognized posture state, and determines the display format based on a judgment result. Then, the display control portion 124 transmits, for example, data indicating the determined display format to the communication control portion 120, and thereby causes the data to be transmitted to the communication target external device. Further, the display control portion 124 causes the display portion 112 to perform display on the display screen of the display portion 112 in accordance with the determined display format.

When the first display format is determined as the display format, the display control portion 124 transmits the data relating to display to the communication control portion 120, and thereby causes the data to be transmitted to the communication target external device. Thus, the cooperative display with the communication target external device is achieved.

[When it is Determined that Device Itself Performs Secondary Role]

When the role determination portion 122 determines that the device itself performs the secondary role, the display control portion 124 determines the display format based on the display switch information received by the communication portion 102. Then, the display control portion 124 causes the display portion 112 to perform display on the display screen of the display portion 112 in accordance with the determined display format.

Because the control portion 108 includes the communication control portion 120, the role determination portion 122 and the display control portion 124, the control portion 108 can perform a leading role in performing the process (1) (the communication process) to the process (5) (the display process).

The operation portion 110 is an operation unit that makes it possible for the user to perform operations, and is provided in the information processing device 100. Because the information processing device 100 includes the operation portion 110, the user can perform a selection operation etc. using the dialog shown in FIG. 2A, for example. Thus, it is possible to perform a process that the user wants.

Note that the operation portion 110 may be a button, a direction key, a rotary selector such as a jog dial, or a combination of these, for example.

The display portion 112 is a display unit included in the information processing device 100, and displays various pieces of information on the display screen. A screen displayed on the display screen of the display portion 112 may be, for example, a screen of the second display format, an example of which is shown in FIG. 1A, a screen of the first display format, examples of which are shown in FIG. 1B and FIG. 1C, or an operation screen that causes the information processing device 100 to perform a desired operation. The display portion 112 may be an LCD or an organic EL display, for example. In a case where the information processing device 100 includes the electrostatic touch panel 164 as shown in FIG. 6, the display portion 112 can be a touch screen. In this case, the display portion 112 functions as an operation display portion on which both user operation and display can be performed.

The coupling portion 114 has a mechanism that enables the external device to be attached and detached, and selectively holds the relative posture state with the external device. The coupling portion 114 may be a hinge, for example.

The information processing device 100 achieves the process (1) (the communication process) to the process (5) (the display process) by the structure shown in FIG. 5, for example. Therefore, the information processing device 100 can selectively switch the display format displayed on the display screen of each of the devices, based on the relative posture state between the devices. Note that it is needless to mention that the structure of the information processing device according to the embodiment of the present invention is not limited to that shown in FIG. 5.

As described above, the information processing device 100 according to the embodiment of the present invention performs the process (1) (the communication process) to the process (5) (the display process), whereby it performs display using the display format determined by the device itself or using the display format determined by the external device, thus performing selective display switching. Regardless of which of the above display formats is used to perform display by the information processing device 100, the information processing device 100 can perform display using the display format that is determined based on the relative posture state between the information processing devices 100. Therefore, the information processing device 100 can dynamically switch the display format of the display screen, depending on the relative posture state between the information processing devices 100 that cooperate with each other to perform display, thus achieving flexible switching between the display formats. Further, the information processing device 100 performs communication with the external device by wireless communication using, for example, IEEE802.15.1, the IEEE802.11 series, NFC or the like, and performs switching of the display format based on the communication. In other words, with the information processing device 100, the posture that enables connection with the external device is not restricted by a mechanism (for example, wiring) for physically connecting the external device as in the known technology. Accordingly, based on the relative posture state between the devices, the information processing device 100 can selectively switch the display format displayed on the display screen of each of the devices.

Further, because the information processing device 100 can selectively switch the display format displayed on the display screen of each of the devices based on the relative posture state between the devices, it is possible to provide the user with display (FIG. 1A to FIG. 1C, for example) in accordance with intended purposes of the user, for example. More specifically, the information processing device 100 can provide display in accordance with the intended purposes, for example, when portability/energy saving is considered important (FIG. 1A, for example), when the user wants to perform web browsing using a larger screen (FIG. 1B, for example), or when the user especially wants to perform a key input operation (FIG. 1C, for example).

The information processing device 100 can achieve dynamic switching of the display format using a detection device such as an accelerator sensor, and a versatile device such as a communication device compatible with IEEE802.15.1 or the like. Therefore, the information processing device 100 can improve versatility as compared to the known information processing device that is required to be provided with a unique mechanism for physically connecting an external device.

Hereinabove, the information processing device 100 is used to explain the embodiment of the present invention. However, the embodiment of the present invention is not limited to the above-described forms. The embodiment of the present invention can be applied to various devices, for example, computers such as a PC and a personal digital assistant (PDA) etc., mobile communication devices such as a mobile telephone and a Personal Handyphone System (PHS) etc., a video/music playback device (or a video/music recording and playback device), a mobile game console, display devices such as an LCD etc., a television receiver that can receive digital/analogue broadcast, and the like.

(Program According to Information Processing Device of the Embodiment of the Present Invention)

With a program that causes a computer to function as the information processing device according to the embodiment of the present invention, it is possible to selectively switch the display format displayed on the display screen of each of the devices, based on the relative posture state between the devices.

It should be understood by those skilled in the art that various modifications, combinations, sub-combinations and alterations may occur depending on design requirements and other factors insofar as they are within the scope of the appended claims or the equivalents thereof.

For example, in the information processing device 100 shown in FIG. 5, the control portion 108 includes the communication control portion 120, the role determination portion 122 and the display control portion 124. However, the structure of the information processing device according to the embodiment of the present invention is not limited to that described above. For example, the information processing device according to the embodiment of the present invention may separately include the communication control portion 120, the role determination portion 122 and the display control portion 124 shown in FIG. 5 (such that these portions are formed by separate processing circuits, for example).

Further, as described above, the program (computer program) is provided that causes the computer to function as the information processing device according to the embodiment of the present invention. Moreover, the embodiment of the present invention can also provide a storage medium that stores the above-described program.

It should be appreciated that the arrangements described above only represent exemplary embodiments of the present invention, and that the arrangements are embraced in the technical scope of the present invention.

What is claimed is:

1. An information processing device comprising:
    a communication portion that communicates with an external device;
    a detection portion that detects a posture of the information processing device; and
    a display control portion that controls display on a display screen based on one of a display format that is determined based on posture information indicating the posture of the information processing device detected by the detection portion and external posture information indicating a posture of the external device that is received by the communication portion, and a display format based on display switch information indicating a display format that is received by the communication portion,
    wherein one of the information processing device and the external device is designated to perform a primary role and the other of the information processing device and the external device is designated to perform a secondary role, wherein the display control portion judges a relative posture state between the information processing device and the external device, based on the posture information and the external posture information, wherein, based on a judgment result, the display control portion selectively determines one of a first display format in which the information processing device and the external device perform cooperative display, and a second display format in which the information processing device and the external device do not perform the cooperative display, wherein, based on the posture information and the external posture information, the display control portion identifies a first horizontal direction, a first vertical direction and a first depth direction of the information processing device and a second horizontal direction, a second vertical direction and a second depth direction of the external device, respectively, and wherein the display control portion determines the first display format as the display format when an angle between the first horizontal direction and the second horizontal direction, an angle between the first vertical direction and the second vertical direction, and an angle between the first depth direction and the second depth direction each have a value within a predetermined range set according to user input.

2. The information processing device according to claim 1, further comprising:

a role determination portion that determines, based on the communication with the external device, the role relating to display on the display screen of each of the information processing device and the external device that is a communication target, wherein when the role determination portion determines that the information processing device performs a primary role that determines the display format on the display screen of each of the information processing device and the external device that is the communication target, the display control portion determines, based on the posture information and the external posture information, the display format used by each of the information processing device and the external device corresponding to the external posture information.

3. The information processing device according to claim 2, wherein, when the role determination portion determines that the information processing device does not perform the primary role, the display control portion performs display on the display screen based on the display switch information received by the communication portion.

4. The information processing device according to claim 1, wherein, based on a magnitude of each of the angles between corresponding directions and a predetermined threshold value, the display control portion judges whether the relative posture state between the information processing device and the external device is one of a state indicating a forward direction and a state indicating a reverse direction, and wherein, based on a judgment result, the display control portion determines one of a third display format corresponding to the forward direction and a fourth display format corresponding to the reverse direction, as the first display format.

5. The information processing device according to claim 1, wherein the display control portion causes the display switch information indicating the determined display format to be transmitted to the external device.

6. The information processing device according to claim 1, further comprising:

a coupling portion to and from which the external device is capable of being attached and detached, the coupling portion selectively holding a relative posture state with the external device.

7. A display control method, comprising the steps of:

starting communication with an external device;

determining, based on the communication with the external device, a role relating to display on a display screen of each of an information processing device and the external device that is a communication target;

controlling display on the display screen based on a display format that is determined based on posture information indicating a detected posture of the information processing device and received external posture information indicating a posture of the external device, when it is determined in the determining step that the information processing device performs a primary role that determines the display format on the display screen of each of the information processing device and the external device that is the communication target; and controlling display on the display screen based on a display format that is based on received display switch information indicating a display format, when it is determined in the determining step that the information processing device does not perform the primary role, wherein one of the information processing device and the external device is designated to perform a primary role and the other of the information processing device and the external device is designated to perform a secondary role, and wherein controlling display comprises (i) judging a relative posture state between the information processing device and the external device, based on the posture information and the external posture information, (ii) based on a judgment result, selectively determining one of a first display format in which the information processing device and the external device perform cooperative display, and a second display format in which the information processing device and the external device do not perform the cooperative display, (iii) based on the posture information and the external posture information, identifying a first horizontal direction, a first vertical direction and a first depth direction of the information processing device and a second horizontal direction, a second vertical direction and a second depth direction of the external device, respectively, and (iv) determining the first display format as the display format when an angle between the first horizontal direction and the second horizontal direction, an angle between the first vertical direction and the second vertical direction, and an angle between the first depth direction and the second depth direction each have a value within a predetermined range set according to user input.

8. A non-transitory computer-readable medium having stored thereon a computer-readable program comprising instructions that command a computer to perform the steps of:

starting communication with an external device;

determining, based on the communication with the external device, a role relating to display on a display screen of each of an information processing device and the external device that is a communication target;

controlling display on the display screen based on a display format that is determined based on posture information indicating a detected posture of the information processing device and received external posture information indicating a posture of the external device, when it is determined in the determining step that the information processing device performs a primary role that determines the display format on the display screen of each of the information processing device and the external device that is the communication target; and controlling display on the display screen based on a display format that is based on received display switch information indicating a display format, when it is determined in the determining step that the information processing device does not perform the primary role, wherein one of the information processing device and the external device is designated to perform a primary role and the other of the information processing device and the external device is designated to perform a secondary role, and wherein controlling display comprises (i) judging a relative posture state between the information processing device and the external device, based on the posture information and the external posture information, (ii) based on a judgment result, selectively determining one of a first display format in which the information processing device and the external device perform cooperative display, and a second display format in which the information processing device and the external device do not perform the cooperative display, (iii) based on the posture information and the external posture information, identifying a first horizontal direction, a first vertical direction and a first depth direction of the information processing device and a second horizontal direction, a second vertical direction and a second depth direction of the external device, respectively, and (iv) determining the first display format as the display format when an angle between the first horizontal direction and the second horizontal direction, an angle between the first vertical direction and the second vertical direction, and an angle between the first depth direction and the second depth direction each have a value within a predetermined range set according to user input.

* * * * *